United States Patent
Hamada et al.

(10) Patent No.: US 7,022,636 B2
(45) Date of Patent: Apr. 4, 2006

(54) CERAMIC MEMBER FOR SEMICONDUCTOR MANUFACTURING EQUIPMENT

(75) Inventors: Toshiyuki Hamada, Kokubu (JP); Masahiro Nakahara, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/263,460

(22) Filed: Oct. 2, 2002

(65) Prior Publication Data

US 2003/0087751 A1    May 8, 2003

(30) Foreign Application Priority Data

Oct. 3, 2001    (JP) .............................. 2001-307778

(51) Int. Cl.
*C04B 35/505* (2006.01)
*C04B 35/111* (2006.01)

(52) U.S. Cl. ..................... 501/152; 501/127; 501/153

(58) Field of Classification Search ................ 501/152, 501/153, 153 B, 127
See application file for complete search history.

(56) References Cited

U.S. PATENT DOCUMENTS 5,484,752 A * 1/1996 Waku et al. ................. 501/127
5,569,547 A * 10/1996 Waku et al. ................. 428/688
5,580,837 A * 12/1996 Dodds et al. ................ 501/152
6,383,964 B1 * 5/2002 Nakahara et al. ............ 501/152

FOREIGN PATENT DOCUMENTS

| JP | 05-217946 | 8/1993 |
| JP | 08-325054 | 12/1996 |
| JP | 2001-028502 | 1/2001 |
| JP | 2002-398395 | * 2/2002 |

* cited by examiner

*Primary Examiner*—Karl Group
(74) *Attorney, Agent, or Firm*—Hogan & Hartson, LLP.

(57) ABSTRACT

There is provided a ceramic member for semiconductor manufacturing equipment which is formed of an alumina-based sinter containing an yttrium-aluminum-garnet at the amount of 3 to 50 wt %, silicon oxide at the amount of not more than 0.2 wt %, preferably 0.1 wt %, and the balance substantially alumina, wherein the sinter has dielectric loss of not more than $4 \times 10^{-4}$ particularly $2.5 \times 10^{-4}$ or less in the frequency range of 10 MHz to 5 GHz. Such a member may be formed of a ceramic sinter including an aluminum phase having mean crystal grain size in a range of 2 to 10 μm and a yttrium-aluminum-garnet phase having a mean crystal grain size in a range of 1.5 to 5 μm, wherein the ratio of the mean crystal grain size of the alumina phase to that of the yttrium-aluminum-garnet phase is larger than 1 and smaller than 7.

4 Claims, 1 Drawing Sheet

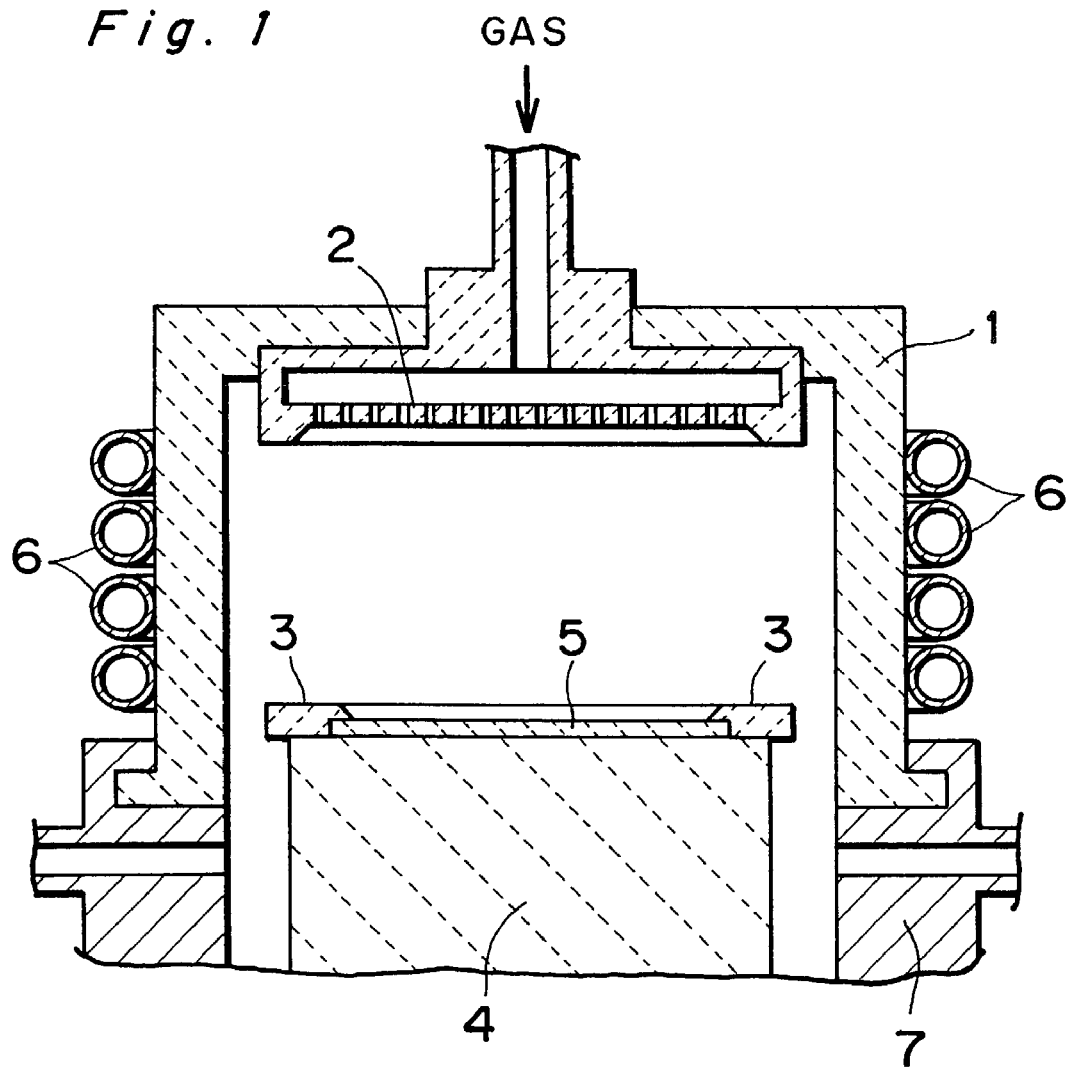

CERAMIC MEMBER FOR SEMICONDUCTOR MANUFACTURING EQUIPMENT

BACKGROUND OF THE INVENTION

1. Field of the Invention

The present invention relates to a ceramic member for semiconductor manufacturing equipment which is formed of a ceramic material having a low dielectric loss and high corrosion resistance and, in particular, to a ceramic member having high strength and excellent machinability.

2. Prior Art

In semiconductor manufacturing Process, there have been used equipment for etching or cleaning a wafer therein by using halogen plasma, which is provided with members including, for example, an inner wail making up a chamber, a microwave-introducing window or inlet for introducing microwave into the chamber, a focus ring, a clamp ring for fixing a wafer to be treated on a stage or electrode, a susceptor and the like.

FIG. 1 shows as example of semiconductor manufacturing equipment, a processing chamber used for halogen-plasma etching or cleaning systems in producing semiconductor devices. This chamber includes a chamber wall 1, with a high frequency induction coil 6 arranged on the outside of the chamber to generate plasma in a space of the chamber, with a shower head 2 fixed at the upper portion inside the chamber wall 1 to supply a gas mixture containing a halogen gas into the chamber and with a lower electrode 4, or a stage, arranged at the lower portion in order to mount a wafer 5 to be processed thereon. Furthermore, a clamp ring 3 for fixing the wafer 5 is mounted on the lower electrode.

Excepting work pieces such as the semiconductor wafer to be processed, the members such as chamber wall 1, shower head 2 and clamp ring 3 have been made of corrosion-resistant material such as quartz, stainless steel, alumina or the like. Also, there have been utilized sintered materials of alumina or aluminum nitride, and materials obtained by coating these ceramic sintered materials with a ceramic film of silicon. Further, Such members of the semiconductor manufacturing equipment have conventionally been made of alumina-based sinters which have high corrosion resistance to gases containing fluorine or chlorine and are available at low prices.

While in such semiconductor manufacturing equipment, radio frequency or microwave is introduced into the reaction chamber to generate plasma of halogen, alumina-based sinters absorb so considerable large a part of RF wave or microwave input to generate heat. This in turn poses problems of causing plasma generation efficiency to deteriorate due to energy loss.

Moreover, another problem is that local heat generation within the ceramic body causes partial expansion of the body to form cracks in the alumina-based sintered member. For this reason, alumina-based sinters have been required to have lower dielectric loss, and for example, Japanese Patent Laid-Open Publication NO. 5-217946 proposes a technique in which for a bell jar, a high-purity alumina-based sinter is used which contains reduced amounts of $SiO_2$ and alkali metal oxide so that its dielectric loss levels at 1 GHz to 10 GHz may be lowered to be $8\times10^{-4}$ or less ($0.9\times10^{-4}$ at the smallest). Also, Japanese Patent Laid-Open Publication No. 2001-28502 discloses a technique for an RF or microwave penetration window which is produced of a ceramic sintered body containing principally either an yttrium-aluminum-garnet (hereinafter, abbreviated as YAG) or alumina, and silicon oxide at an amount of between 0.1 to 10 wt %, thereby decreasing dielectric loss to the level of $5\times10^{-3}$ or less at 10 MHz to 10 GHz.

Unfortunately, the alumina-based sinter as disclosed in the above Japanese Patent Laid-Open Publication NO. 5-217946 or the ceramic sinter disclosed in Japanese Patent Laid-Open Publication 2001-28502 have not so high strength as to be used for portions where high stress is applied without any shape constraints.

Also, in order to reduce energy absorption loss within members in semiconductor manufacturing equipment, it is required that the dielectric loss, in the wide frequency ranges of 10 MHz to 5 GHz, of the ceramic sinters comprising the members of the semiconductor manufacturing equipment should be reduced to as low a level as possible.

However, the ceramic material disclosed in Japanese Patent Laid-Open Publication 2001-28502 does not provide enough low dielectric loss, which is about $5\times10^{-4}$ in a region of 10 MHz to 10 GHz even in a case of lowest loss. Therefore, further lower dielectric loss is required in such ceramic dielectric materials to be used for the above applications.

On the other hand, Japanese Patent Laid-Open Publication NO. 8-325054 discloses a dielectric material having lower dielectric loss. The ceramic sinter is composed principally of alumina with 0.5 wt % of yttrium oxide contained, layers of a $Y_2O_3$ or $Al_2O_3$—$Y_2O_5$ compound being formed between aluminum grain boundaries, thereby achieving dielectric loss of less than $1\times10^{-4}$ levels at 7 GHz to 9 GHz.

It has been known that dielectric loss of ceramic sinters generally increases with a decrease in frequency from high-frequency microwave regions to radio frequency regions. while the above ceramic sinter as disclosed in Japanese Patent Laid-Open Publication NO. 8-325054 is actually very low in dielectric loss at the region of 7 GHz to 9 GHz, it increases in dielectric loss in the lower frequency regions, for Example, of 10 MHz to 5 GHz.

Still further, alumina powder used for manufacturing the above ceramic sinter have contained silicon oxide as an impurity and such ceramic sinter may have included foreign silicon oxide particles derived from the outside during ceramic manufacturing process. A considerable high level of silicon oxide may be accumulated as a non-careful impurity in the ceramic sintered body and such impurity has a risk of causing the dielectric loss at the region of 10 MHz to 5 GHz to further increase. Thus, with the ceramic sinter, sufficient reduction of energy loss due to the heat generation at RF or microwave region could not be attained so far.

Furthermore, the alumina-based sinters disclosed in Japanese Patent Laid-Open Publications NO. 5-217946, 2001-28502 and NO. 8-325054 are low in grindability with their large fracture toughness values, therefore taking long time in machining. Thus, such conventional alumina-based sinters have had an problem that long machining time would be reflected to raise cost of each ceramic member, resulting in high priced semiconductor manufacturing equipment. A ceramic sintered body composed principally of YAG is disclosed in Japanese Patent Laid-Open Publication 2001-28502, and the ceramic body, low in bending strength, poses the problem that it tends to be chipped or cracked easily in assembly or handling operation process.

SUMMARY OF THE INVENTION

An object of the present invention is to provide a ceramic member for semiconductor manufacturing equipment the member having a small dielectric loss at an RF and microwave region of 10 MHz to 5 GHz which is of main use with semiconductor manufacturing equipment, being excellent in corrosion resistance to halogen corrosive gases such as fluorine and chlorine, and moreover having a relatively large bending strength.

Another object of the invention is to provide a ceramic member for semiconductor manufacturing equipment having high machinability in addition to the above properties.

Accordingly, in view of the above-described issues, according to the present invention, there is provided a ceramic member for semiconductor manufacturing equipment which is formed of an alumina-based sinter comprising an yttrium-aluminum-garnet at the amount of 3 to 50 wt %, silicon oxide at the amount of not more than 0.2 wt % and the balance substantially alumina, thereby reducing dielectric loss into not more than $4 \times 10^{-4}$ in the frequency range of 10 MHz to 5 GHz.

In the ceramic member of the invention, the amount of silicon oxide content in the alumina-based sinter preferably may be not more than 0.1 wt %, and the dielectric loss of the alumina-based sinter being $2.5 \times 10^{-4}$ or less.

In the ceramic member, the ceramic sinter may comprise a aluminum phase having mean crystal grain size in a range of 2 to 10 μm and a yttrium-aluminum-garnet phase having a mean crystal grain size in a range of 1.5 to 5 μm. It is Preferable to set the ratio of the mean crystal grain size of the alumina phase to that of the yttrium-aluminum-garnet phase into larger than 1 and smaller than 7.

BRIEF DESCRIPTION OF THE DRAWINGS

FIG. 1 is a schematically partially cross sectional view showing a semiconductor manufacturing device made up of corrosion-resistant ceramic members, the device being used in use for a step for etching or cleaning a semiconductor device in the process of manufacturing the same.

DETAILED DESCRIPTION OF THE PREFERRED EMBODIMENTS

In a embodiment of the invention, a ceramic member for semiconductor manufacturing equipment is an alumina-based sinter having a yttrium-aluminum-garnet (hereinafter, referred to as YAG) content of 3 to 50 wt % and a silicon oxide content of not more than 0.2 wt %, the remainder being composed substantially of alumina, thereby reducing the dielectric loss of the ceramic sinter to a level of $4 \times 10^{-4}$ or less at a frequency region of 10 MHz to 5 GHz.

YAG as a subsidiary ingredient has actions of suppressing growth of alumina grains and of densifying an alumina-based sinter so that the member can be improved in bending strength and hardness as compared with alumina-based sinters without containing any YAG. Moreover, since YAG, being excellent in corrosion resistance to halogen corrosive gas or halogen plasma including fluorine or chlorine as well as alumina, is present as a boundary layer between alumina grains in the alumina-based sinter, and is highly liable to corrosion, the alumina-based sinter can be improved in corrosion resistance as compared with alumina-based sinters containing no YAG.

Also, in the ceramic member of the invention, while generally silicon oxide is contained in the alumina-based sinter as an impurity, in the present invention, a reduction in silicon oxide content allows the dielectric loss to be lowered. By reducing the silicon oxide to 0.2 wt % or less in the ceramic sinter, it is possible to set the dielectric loss at 10 MHz to 5 GHz in the alumina-based sinter to $4 \times 10^{-4}$ or less.

Such a low silicon ceramic member of the invention, when used in semiconductor manufacturing equipment, can suppresses absorption of RF or microwaves and effectively prevent heat generation, the energy loss due to heat generation being reduced with stable plasma being maintained over a considerable long operating period.

In this connection, although it is not clear why a reduction in silicon oxide content in the alumina-based sinter allow for decreased dielectric loss, it is considered that this is because the reducing of the silicon oxide content allows vibrations of ions in the alumina ceramic structure to be reduced.

In order to obtain such a ceramic member for semiconductor manufacturing equipment, it is important that the ceramic sinter contains YAG at a range of 3 to 50 wt % while silicon oxide is limited to be contained at an amount of not more than 0.2 wt %.

Regarding the reasons of these limitations, a content of more than 50 wt % of YAG causes a main ingredient to be a YAG phase so that mechanical characteristics of the sintered body would be dominated by the mechanical characteristics of YAG, in which case the ceramic sintered body would be made much lower in bending strength and hardness as compared with an alumina-based sinter without containing YAG.

Conversely, when the YAG content is lower than 3 wt %, such a low contents of YAG make it impossible to provide a very low dielectric loss such as $4 \times 10^{-4}$ or less for the alumina-based sinter at 10 MHz to 5 GHz, and would lose its effect of suppressing the growth of alumina grains. Thus, such a low YAG level dose not improves bending strength or hardness of the alumina-based sinter and moreover does not realize even its effect of lowering the fracture toughness values.

As regards a reason of silicon content, the silicon oxide of greater than 0.2 wt % contents in the alumina-based sinter would not provide a dielectric loss of $4 \times 10^{-4}$ or less at a lower frequency level of 10 MHz to 5 GHz as described above.

In order to reduce the dielectric loss at the lower frequency range between the 10 MHz to 5 GHz, it is desirable that the silicon oxide content should be set as low as possible. Preferably, the silicon oxide content in the alumina-based sinter should be set to not more than 0.1 wt %. With such a range of setting, the dielectric loss of the alumina-based sinter can be further lowered to $2.5 \times 10^{-4}$ in the above frequency range.

It is noted herein that, in the present invention, a dielectric loss is measured by using an RF current-voltage technique in ranges of RF regions of 10 MHz to 1000 MHz and a cavity resonator technique in ranges of microwave regions (1 GHz to 5 GHz). In the alumina-based sinter of the present invention, the measurements of the dielectric loss determined through these two measurement techniques at any frequencies in the range between 10 MHz and 5 GHz must indicate $4 \times 10^{-4}$ or less.

The alumina-based sinter making up a ceramic member for semiconductor manufacturing equipment contains only the balance substantial alumina except for YAG as secondary component at a range of 3 to 50 wt % as well as 0.2 wt % or less of silicon oxide. However, the balance substantial alumina may also contain magnesium oxide, calcium oxide, and the like as inevitable impurities in the alumina-based sinter provided that only their total contents are 1 wt % or less with respect to the sinter.

Further, the alumina-based sinter forming the ceramic member for semiconductor manufacturing equipment of the invention, preferably, may have a mean crystal grain size of alumina grains of 2 to 10 µm and a mean crystal grain size of YAG phase of 1.5 to 5 µm.

In more detail, more than 10 µm mean crystal grain sizes of alumina phase causes a multiplicity of pores to be interveniently present in the alumina-based sinter structure, making it impossible to improve the bending strength and hardness of the sinter. Furthermore, upon exposure to plasma, edges of the pores would be liable to corrosion which accelerate the further progress of corrosion. ON the other hand, mean alumina grain sizes of less than 2 µm or less cause the fracture toughness value of the sinter to increase, impairing machinability.

Also, more than 5 µm mean crystal grain sizes of YAG causes the fracture toughness value of the alumina-based sinter to become too small, causing chipping or cracking to occur during grinding process so that high-precision manufacture becomes difficult to attain and that chipping or cracking would occur in handling. Conversely, less than 1.5 µm mean crystal grain sizes of a YAG phase causes the fracture toughness value of the alumina-based sinter to increase too much, impairing machinability.

Preferably, the mean crystal grain size of alumina is within a range of 3 to 7 µm and the mean crystal grain size of YAG is within a range of 1.8 to 5 µm.

for the YAG in the alumina-based sinter, it is preferable that its mean crystal grain size is moderately smaller than the mean crystal grain size of alumina, which is the main ingredient, and that the ratio of the mean crystal grain size of alumina to the mean crystal grain size of YAG is greater than 1 and smaller than 7.

The ratio of less than 1 cause the grain size of YAG to approach the grain size of alumina, causing the mechanical characteristics of the alumina-based sinter such as bending strength, hardness, fracture toughness value and the like to lower, and causing the thermal shock resistance of the alumina-based sinter to also lower. On the other hand, the ratio being more than 7 of the mean crystal grain size of alumina to that of YAG cause the fracture toughness value of the alumina-based sinter to become too high so that the machinability is impaired.

The ceramic member for semiconductor manufacturing equipment of the invention falling within such ranges has a low dielectric loss of $4 \times 10^{-4}$ or less as a dielectric loss at a region of 10 MHz to 5 GHz.

Further, the ceramic member is excellent in corrosion resistance to halogen corrosive gases such as fluorine and chlorine, and yet high in both strength and hardness, having a four-point bending strength of 290 MPa or more and a Vickers hardness of 15 GPa or more. Moreover, the ceramic member has a thermal shock resistance ($\Delta T$) of 150° C. or more and a fracture toughness value within a range of 2.0 to 3.9 MPa·$\sqrt{m}$. Thus, the alumina-based sinter can be improved in machinability without being damaged in handling.

Furthermore, the ceramic member for semiconductor manufacturing equipment of the invention, having a thermal shock resistance ($\Delta T$) of 150° C. or more, is less likely to be cracked due to thermal shocks or the like even if heat is generated by absorption the RF waves or microwaves. Thus, the ceramic member for semiconductor manufacturing equipment can be used stably at all times.

For manufacture of the ceramic member for semiconductor manufacturing equipment of the invention, first of all, alumina powder containing a small content of silicon oxide, and YAG powder, are prepared as starting materials.

Preferably, the alumina powder to be used has an alumina purity of 95% or more, equivalent to a silicon oxide content of not more than 0.2 wt %, a mean grain size of 1 to 15 µm, and a BET specific surface area of 1 to 4 m²/g.

The YAG powder can be obtained through mixing alumina powder and yttria powder together in the material formulation of a molar fraction $X_Y$ of 0.365 to 0.385 of $Y_2O_3$ and a molar fraction $X_A$ of 0.615 to 0.635 of $Al_2O_3$ wherein $X_Y + X_A = 1$.

Thereafter, the mixture is calcinated at 1000 to 1600° C., followed by a grinding step in which the powders are preferably prepared in a mean grain size of 0.6 to 1.2 µm and a BET specific surface area of 2 to 5 m²/g.

Then, the YAG powder is mixed into the alumina powder at a range of 3 to 50 wt %, and further desired organic binders such as wax emulsion (wax plus emulsifier), polyvinyl alcohol (PVA), polyethylene glycol (PEG) or the like are added and mixed thereto to make a slurry or then dried to make granulated powder. During this process, care should be taken as much as possible in order to prevent silicon oxide from mixing thereinto, so that the silicon oxide content after sintering becomes not more than 0.2 wt %.

Then, in the case where slurry is used, the slurry is molded into a specified shape by a tape casting process such as casting process, injection molding process or doctor blade method. In the case where granulated powder is used, the granulated powder is charged into the mold, and subjected to single-screw pressure-molding process such as press molding, or molded into a specified shape by using isotropic pressure-molding process such as rubber press molding. Then, the resulting molded product is degreased at 300 to 600° C. as required, and thereafter fired at a temperature range of 1500 to 1750° C. in an atmospheric air.

It is noted here that the reason why the firing temperature is set to 1500 to 1750° C. is that less than 1500° C. temperatures would cause the firing not to progress enough, making it impossible to attain the compacting, while more than 1750° C. temperatures, conversely, would cause abnormal grain growth of alumina particles or YAG particles to develop so that such mechanical characteristics as bending strength, hardness and fracture toughness value of the alumina-based sinter would lower.

By the firing under the above shown conditions, there can be obtained an alumina-based sinter which has a low dielectric loss of $4 \times 10^{-4}$ or less as a dielectric loss at a region of 10 MHz to 5 GHz, and which has a high strength and a high hardness of a 290 MPa or more four-point bending strength and a 15 GPa or more Vickers hardness, and moreover which has a thermal shock resistance ($\Delta T$) of 150° C. or more and a fracture toughness value within a range of 2.0 to 3.9 MPa·$\sqrt{m}$. Then, by machining this alumina-based sinter into a specified shape, the ceramic member for semiconductor manufacturing equipment of the invention can be obtained.

EXAMPLES

Example 1

With respect to the alumina-based sinter forming the ceramic member for semiconductor manufacturing equipment, experiments for determining a dielectric loss at 10 MHz to 5 GHz, four-point bending strength, Vickers hardness, fracture toughness value, thermal shock resistance and corrosion resistance were performed while the contents of YAG and silicon oxide and the mean crystal grain sizes of alumina and YAG were varied respectively.

For the alumina-based sinter used in this experiment, alumina powder having a mean particle size of 1 to 15 µm, a BET specific surface area of 1 to 4 m²/g and an alumina purity of not less than 99.5% equivalent to a silicon oxide content of not more than 0.2 wt %, and YAG powder having a mean particle size of 0.6 to 1.2 µm and a BET specific surface area of 2 to 5 m²/g, were used as starting materials. These powders were blended at ratios shown in Table 1, and further ion exchange water as well as wax emulsion, PVA and PEG as binders were added thereto, followed by drying, by which granulated powder was prepared.

Next, the resulting granulated powder was charged into a metal mold, and a 60 mm-diameter, 5 mm-thick disc-shaped article was fabricated by press molding process. Thereafter, the article was degreased at 400° C., and further fired at a temperature of 1500 to 1750° C. in an atmospheric air for about 5 hours. Thus, an alumina-based sinter as a sample was obtained.

In addition, with respect to articles fabricated under the same conditions, alumina, YAG and silicon oxide were identified and their contents were examined by the powder X-ray diffraction method, finding that their contents fell within ranges similar to those when they had been added. Furthermore, articles fabricated under the same conditions were observed with a scanning electron microscope, and respective mean crystal grain sizes of alumina and YAG were measured with an image analysis system (Luzex). Results are shown in Table 1.

Then, with respect to each of the samples obtained, dielectric loss at 10 MHz to 5 GHz, four-point bending strength, Vickers hardness, fracture toughness value, thermal shock resistance and corrosion resistance were measured and evaluated, respectively.

As to the dielectric loss at 10 MHz to 5 GHz, each sample obtained was ground to a thickness of 1.0 mm, and its dielectric loss was measured by using the RF current-voltage method for the RF region of 10 to 1000 MHz and by using the cavity resonator method for the microwave region of 1 to 5 GHz. Then, samples which showed a dielectric loss ($\delta$) at 10 MHz to 5 GHz of not more than $4\times10^{-4}$ were evaluated as excellent ones. It is noted that the numerical value for dielectric loss was given by adopting maximum numerical values within respective measurement ranges.

The four-point bending strength was measured in accordance with JIS R1601. Samples which were lower in this measurement value than the four-point bending strength of an alumina-based sinter (with an alumina content of 99.5 wt %) prepared as a reference sample were marked by C, those which were higher than the reference sample were marked by B, and those which were further higher were marked by A.

The Vickers hardness was measured in compliance with JIS R 1610. Samples which were higher in this measurement value than the Vickers hardness of an alumina-based sinter (with an alumina content of 99.5 wt %) prepared as a reference sample were evaluated as excellent.

The fracture toughness value was measured in compliance with JIS R 1607. Samples of which this measurement value fell within a range of 2.0 to 3.9 MPa·$\sqrt{m}$ were evaluated as excellent by virtue of their being good at machinability and free from damage in handling, and marked by B. In particular, those which fell within a range of 2.3 to 3.5 MPa·$\sqrt{M}$ were even more excellent in machinability, marked by A. In addition, those which fell outside the range of 2.0 to 3.9 MPa·$\sqrt{M}$ were poor at machinability, and marked by C.

As to the thermal shock resistance, the four-point bending strength was measured after dropping into water in compliance with the drop-in underwater quenching method. Samples which showed $\Delta T$ values in strength deterioration not less than 150° C. were regarded as good.

For measurement of the corrosion resistance, each sample surface was mirror-finished by lapping, and set to an RIE (Reactive Ion Etching) system, and exposed to plasma for 3 hours in a $Cl_2$ gas atmosphere. From a decrement of weight before and after that, an etching rate per minute was calculated, and determined as a relative comparison value on the basis of the etching rate, 1, of an alumina-based sinter (with an alumina content of 99.5 wt %) prepared as a reference sample. Samples whose relative comparison value was less than 1 were regarded as excellent.

Then, samples which were excellent in all the requirements of four-point bending strength, Vickers hardness, fracture toughness value, thermal shock resistance and corrosion resistance and whose dielectric loss (tan $\delta$) at 10 MHz to 5 GHz were not more than $4\times10^{-4}$ were evaluated as excellent.

In addition, a YAG sintered body was also used as a comparative example, and measured under the same conditions.

TABLE 1

| Sample No. | YAG [0064] cont. (wt %) | [0066] Si oxide [0067] cont. (wt %) | Mean crystal grain size Alumina (µm) | YAG (µm) | (Alumina/YAG) size Ratio | Dielectric loss (×10⁻⁴) 10 MHz– 5 GHz | 1 GHz– 5 GHz | Four-point bending strength MPa | Eva. | Vickers hardness (GPa) | Fracture toughness value (MPa·$\sqrt{m}$) | Eva. | Thermal shock resist. ΔT [0068] (° C.) | Etching rate (Å/min) |
|---|---|---|---|---|---|---|---|---|---|---|---|---|---|---|
| * 1 | 2 | 0.2 | 13.5 | 1.3 | 10.38 | 4.6 | 2.3 | 280 | C | 14 | 4.2 | C | 190 | 0.98 |
| 2 | 3 | 0.2 | 10.5 | 1.5 | 6.67 | 4.0 | 2.0 | 310 | B | 15 | 3.9 | B | 190 | 0.9 |
| 3 | 5 | 0.2 | 7.0 | 2.2 | 3.18 | 3.6 | 1.7 | 340 | A | 16 | 3.5 | A | 190 | 0.85 |
| 4 | 5 | 0.2 | 4.5 | 2.4 | 1.88 | 3.5 | 1.4 | 345 | A | 16 | 3.2 | A | 190 | 0.84 |
| 5 | 10 | 0.2 | 3.7 | 2.5 | 1.48 | 3.0 | 1.0 | 300 | A | 16 | 2.9 | A | 180 | 0.6 |
| 6 | 20 | 0.2 | 6.1 | 5.0 | 1.22 | 2.5 | 0.9 | 345 | A | 16 | 2.4 | A | 170 | 0.73 |
| 7 | 20 | 0.2 | 3.5 | 1.8 | 1.94 | 2.8 | 0.9 | 350 | A | 16 | 2.5 | A | 170 | 0.7 |
| 8 | 30 | 0.2 | 3.2 | 2.1 | 1.52 | 2.5 | 0.9 | 340 | A | 16 | 2.3 | A | 160 | 0.62 |
| 9 | 40 | 0.2 | 2.0 | 1.9 | 1.05 | 2.3 | 0.8 | 320 | B | 16 | 2.3 | A | 160 | 0.6 |
| 10 | 50 | 0.2 | 2.5 | 2.4 | 1.04 | 2.1 | 0.8 | 305 | B | 16 | 2.1 | B | 150 | 0.58 |
| 11 | 50 | 0.2 | 4.2 | 4.0 | 1.05 | 1.9 | 0.7 | 300 | B | 15 | 2.0 | B | 150 | 0.6 |
| * 12 | 60 | 0.2 | 3.5 | 4.2 | 0.83 | 1.9 | 0.7 | 280 | C | 15 | 1.9 | C | 140 | 0.56 |
| * 13 | 70 | 0.2 | 3.0 | 4.9 | 0.61 | 2.0 | 0.7 | 260 | C | 14 | 1.8 | C | 130 | 0.52 |

TABLE 1-continued

| Sample No. | YAG [0064] cont. (wt %) | [0066] Si [0065] oxide [0067] cont. (wt %) | Mean crystal grain size Alumina (μm) | YAG (μm) | (Alumina/ YAG) size Ratio | Dielectric loss (×10⁻⁴) 10 MHz– 5 GHz | 1 GHz– 5 GHz | Four-point bending strength MPa | Eva. | Vickers hardness (GPa) | Fracture toughness value (MPa·√m̄) | Eva. | Thermal shock resist. ΔT [0068] (° C.) | Etching rate (Å/min) |
|---|---|---|---|---|---|---|---|---|---|---|---|---|---|---|
| * 14 | Comparative example: YAG sintered body (relative density: 98%) | | | | | 2.0 | 0.7 | 240 | C | 13 | 1.7 | C | 120 | 0.4 |
| ** 15 | Alumina content: 99.5% | | | | | 20.0 | 3.5 | 280 | | 14 | 4.5 | | 200 | 1 |

The mark * represents samples outside the scope of the present invention.
The mark ** represents the reference sample.

Results of individual samples are as shown in Table 1. As a result of this, as can be understood from Table 1, the YAG sintered body, which is the comparative example of Sample No. 14, although good at dielectric loss and corrosion resistance, as compared with the reference sample, yet was quite small in bending strength and also small in hardness and fracture toughness value, thus inferior in mechanical characteristics.

Also, as to Sample No. 1, because of its low YAG content, the dielectric loss (tan δ) at 10 MHz to 5 GHz was unable to be set to $4 \times 10^{-4}$ or less and the corrosion resistance was close to that of the reference sample. Still, because the mean crystal grain size of alumina in the alumina-based sinter was larger than 10 μm and the mean crystal grain size of yttrium-aluminum-garnet was smaller than 1.5 μm, the bending strength and the hardness were nearly equivalent to those of the reference sample, making it unlikely to obtain an improvement. Further, because the ratio of mean crystal grain size of alumina to the mean crystal grain size of yttrium-aluminum-garnet was larger than 7, the fracture toughness value was high, posing a problem in machinability.

Also, as to Sample Nos. 12 and 13, because the YAG content was larger than 50 wt %, bending strength and hardness of the sintered body were equivalent to or less than those of the reference sample, which allowed a deterioration in mechanical characteristics to be seen. Still, because the ratio of the mean crystal grain size of alumina to the mean crystal grain size of yttrium-aluminum-garnet in the alumina-based sinter was not more than 1, the fracture toughness value of the sintered body was also quite small, and moreover a deterioration in thermal shock resistance was also seen.

In contrast to this, as to Sample Nos. 2 to 11, because the YAG content was 3 to 50 wt % and the silicon oxide content was not more than 0.2 wt % with the remaining part being composed substantially of alumina, the corrosion resistance to halogen-related corrosive gases was excellent and moreover the dielectric loss at 10 MHz to 5 GHz was able to be not more than $4 \times 10^{-4}$, and further the bending strength was also able to be improved relative to that of the reference sample.

Furthermore, because the mean crystal grain size of alumina in the alumina-based sinter was within the range of 2 to 10 μm, the mean crystal grain size of yttrium-aluminum-garnet was within the range of 1.5 to 5 μm, and besides the ratio of the mean crystal grain size of alumina to the mean crystal grain size of yttrium-aluminum-garnet was larger than 1 and smaller than 7, the hardness was able to be improved relative to the reference sample, and the thermal shock resistance was able to be prevented from deterioration as compared with the reference sample, and further the fracture toughness value was able to be reduced moderately relative to the reference sample, thus allowing the machinability to be enhanced.

In particular, Sample Nos. 4 to 8, whose YAG content was 5 to 30 wt %, whose mean crystal grain size of alumina was 3.2 to 7 μm, whose mean crystal grain size of YAG was 1.8 to 5 μm, and whose ratio of the mean crystal grain size of alumina to the mean crystal grain size of YAG was larger than 1.5 and smaller than 7, were quite high in both strength and hardness, having 340 MPa or more four-point bending strengths and 16 GPa or more Vickers hardnesses, and excellent also in machinability, shown by fracture toughness values of 2.3 to 3.5 MPa·√m̄, and moreover excellent in thermal shock resistance (ΔT), which was 160° C. or more.

As a consequence, by fabricating a ceramic member for semiconductor manufacturing equipment with the alumina-based sinter having a YAG content of 3 to 50 wt % and a silicon oxide content of not more than 0.2 wt % with the remaining part composed substantially of alumina, the ceramic member for semiconductor manufacturing equipment can be enhanced in corrosion resistance to halogen-related corrosive gases and so improved in life.

Moreover, since its dielectric loss at 10 MHz to 5 GHz can be made not more than $4 \times 10^{-4}$, heat generation due to the absorption of RF waves or microwaves can be suppressed, so that energy loss can be reduced.

Still, even when the ceramic member for semiconductor manufacturing equipment is used as a large-scale ceramic member for semiconductor manufacturing equipment, enough mechanical strength can be obtained.

Also, in addition to the above-described contents, by so setting that the mean crystal grain size of alumina in the alumina-based sinter is 2 to 10 μm, the mean crystal grain size of yttrium-aluminum-garnet is 1.5 to 5 μm, and that the ratio of the mean crystal grain size of alumina to the mean crystal grain size of yttrium-aluminum-garnet in the alumina-based sinter is larger than 1 and smaller than 7, the fracture toughness value of the resulting ceramic member for semiconductor manufacturing equipment can be lowered to some extent as compared with ceramic member for semiconductor manufacturing equipments made of an alumina-based sinter containing no YAG, so that the ceramic member for semiconductor manufacturing equipment can be made excellent in machinability.

Example 2

Next, sample fabrication was carried out under the same conditions as in Working Example 1 so that alumina content, YAG content and silicon oxide content after sintering process would fall within ranges shown in Table 2. Then, experiments for determining respective dielectric losses of the samples with the silicon oxide content varied were performed under the same conditions as in Example 1. Results of these experiments are shown in Table 2.

TABLE 2

| [0080] Sample No. | Alumina content [0081] (wt %) | YAG content (wt %) | Silicon oxide content (wt %) | Dielectric loss ($\times 10^{-4}$) 10 MHz– 5 GHz | 1 GHz– 5 GHz |
|---|---|---|---|---|---|
| * 16 | 88.8 | 5 | 0.50 | 4.5 | 2.3 |
| 17 | 89.2 | 5 | 0.10 | 2.5 | 0.8 |
| 18 | 89.5 | 10 | 0.20 | 3.0 | 1.0 |
| 19 | 89.5 | 10 | 0.10 | 2.5 | 0.8 |
| 20 | 89.5 | 10 | 0.05 | 2.3 | 0.7 |
| 21 | 89.5 | 10 | 0.01 | 2.1 | 0.6 |
| 22 | 79.5 | 20 | 0.20 | 2.8 | 0.9 |
| 23 | 79.5 | 20 | 0.10 | 2.4 | 0.7 |

The mark * is outside the scope of the present invention.

As a result, Sample No. 16, whose silicon oxide content was larger than 0.2 wt %, showed a dielectric loss of larger than $4\times10^{-4}$ at 10 MHz to 1000 MHz.

In contrast to this, Sample Nos. 17 to 23, whose silicon oxide contents were not more than 0.2 wt %, were so excellent that their dielectric losses were able to be reduced to not more than $4\times10^{-4}$ over a wide range of 10 MHz to 5 GHz.

In particular, by setting the silicon oxide content to not more than 0.1 wt %, the dielectric loss at 10 MHz to 5 GHz was able to be made not more than $2.5\times10^{-4}$, which was of special excellence.

As a consequence of this, it can be understood that the dielectric loss at 10 MHz to 5 GHz can appropriately be made not more than $2.5\times10^{-4}$ by setting the YAG content in the alumina-based sinter to 3 to 50 wt % and setting the silicon oxide content to not more than 0.2 wt %, with the remaining part composed substantially of alumina.

As shown above, according to the ceramic member for semiconductor manufacturing equipment of the present invention, the ceramic member for semiconductor manufacturing equipment is formed of an alumina-based sinter which has a yttrium-aluminum-garnet content of 3 to 50 wt % and a silicon oxide content of not more than 0.2 wt %, with the remaining part composed substantially of alumina, where the dielectric loss (tan δ) of this sintered body is not more than $4\times10^{-4}$ at 10 MHz to 5 GHz. Therefore, even in applications to semiconductor manufacturing equipment, heat generation due to the absorption of RF waves or microwaves can be suppressed, thus allowing prevention of damage and moreover allowing the energy loss of the semiconductor manufacturing equipment to be reduced.

In particular, the dielectric loss (δ) of the alumina-based sinter at 10 MHz to 5 GHz can be reduced to not more than $2.5\times10^{-4}$ by setting the silicon oxide content in the alumina-based sinter to not more than 0.1 wt %. Therefore, heat generation due to the absorption of RF waves or microwaves can be suppressed and the energy loss of the semiconductor manufacturing equipment can be reduced more effectively.

Also, the ceramic member for semiconductor manufacturing equipment of the invention has excellent corrosion resistance to halogen-related corrosive gases such as fluorines and chlorines or to their plasma, thus being usable with stability over a long period.

Still more, the ceramic member for semiconductor manufacturing equipment can be improved in bending strength and hardness as compared with ceramic member for semiconductor manufacturing equipments made of an alumina-based sinter containing no YAG. Therefore, even when the ceramic member for semiconductor manufacturing equipment is used as a large-scale ceramic member for semiconductor manufacturing equipment, enough mechanical strength can be obtained.

Also, according to the present invention, by so setting that the mean crystal grain size of alumina in the alumina-based sinter forming the ceramic member for semiconductor manufacturing equipment is 2 to 10 μm, the mean crystal grain size of yttrium-aluminum-garnet is 1.5 to 5 μm, and that the ratio of the mean crystal grain size of alumina to the mean crystal grain size of yttrium-aluminum-garnet is larger than 1 and smaller than 7, the fracture toughness value of the resulting ceramic member for semiconductor manufacturing equipment can be lowered to some extent as compared with ceramic member for semiconductor manufacturing equipment made of an alumina-based sinter containing no YAG, so that the ceramic member for semiconductor manufacturing equipment can be made excellent in machinability.

As a consequence of this, there can be provided a ceramic member for semiconductor manufacturing equipment, with low price, which has enough mechanical strength even in applications to large-scale ceramic member for semiconductor manufacturing equipments, while allowing the machining cost to be lowered, and yet which is composed principally of alumina, a relatively low-priced material by itself.

What is claimed is:

1. A ceramic member for semiconductor manufacturing equipment which is formed of an alumina-based sinter comprising an yttrium-aluminum-garnet at the amount of 3 to 50 wt %, silicon oxide at the amount of not more than 0.2 wt % and the balance substantially alumina,
    wherein the sinter has dielectric loss of not more than $4\times10^{-4}$ in the frequency range of 10 MHz to 5 GHz, a 290 MPa or more four point bending strength, and a 15 GPa or more Vickers hardness,
    wherein the ceramic sinter comprises an alumina phase having mean crystal grain size in a range of 2 to 10 μm and a yttrium-aluminum-garnet phase having a mean crystal grain size in a range of 1.5 to 5 μm, wherein the ratio of the mean crystal grain size of the alumina phase to that of the yttrium-aluminum-garnet phase is larger than 1 and smaller than 7,
    wherein a starting mixture comprises an alumina powder having grain size of 1 to 15 μm and yttrium-aluminum-garnet powder having grain size of 0.6 to 1.2 μm and the mixture is fired at a temperature range of 1500 to 1750° C. where the crystal grains of alumina and yttrium-aluminum-garnet can not grow abnormally.

2. The ceramic member according to claim 1, wherein the amount of silicon oxide content in the alumina-based sinter is not more than 0.1 wt %, and the dielectric loss of the alumina-based slitter is $2.5\times10^{-4}$ or less.

3. The ceramic member according to claim 1, wherein the sinter has dielectric loss of not more than $2\times10^{-4}$ in the frequency range of 1 GHz to 5 GHz.

4. The ceramic member according to claim 1, wherein the amount of silicon oxide not more than 0.1 wt %.

* * * * *